United States Patent [19]

Sawada et al.

[11] Patent Number: 4,834,881
[45] Date of Patent: May 30, 1989

[54] SPIRAL WOUND TYPE MEMBRANE MODULE

[75] Inventors: Shigeki Sawada; Masaaki Shishido, both of Tokyo, Japan

[73] Assignee: Kurita Water Industries Ltd., Tokyo, Japan

[21] Appl. No.: 231,731

[22] Filed: Aug. 12, 1988

[30] Foreign Application Priority Data

Aug. 19, 1987 [JP] Japan ................................ 62-205809
Aug. 19, 1987 [JP] Japan ................................ 62-205811

[51] Int. Cl.$^4$ .............................................. B01D 13/00
[52] U.S. Cl. ......................... 210/321.74; 210/321.83; 210/494.1
[58] Field of Search ...................... 210/321.74, 321.83, 210/456, 409, 636, 494.1, 651

[56] References Cited

U.S. PATENT DOCUMENTS 3,933,646  1/1976  Kanamaru ................ 210/321.83
3,962,096  6/1976  Ishii et al. ................ 210/494.1 X
4,415,447  11/1983 Foucras ..................... 210/456 X Primary Examiner—Frank Spear
Attorney, Agent, or Firm—Frank J. Jordan; C. Bruce Hamburg; Manabu Kanesaka

[57] ABSTRACT

A spiral wound type membrane module for a water treating apparatus comprising:

a water collection pipe having a hollow inside so as to form a water passage in which openings for communicating the hollow inside with the outside are perforated through the pipe walls;

a separation membrane and a spacer wound around for several turns while being overlaid with each other to the outer circumferential surface of the water collection pipe, in which the separation membrane and the spacer are wound around such that the spacer is disposed between each of the layers of the separation membrane and, therefore, a channel for raw water to be processed and a channel for processed water after permeated through the separation membrane are alternately laminated between each of layers of the separation membrane; wherein the spacer constituting the channel for the water to be processed has corrugating ridges extended in the axial direction of the water collection pipe and the corrugating ridges are extended in a zig-zag manner or, in another embodiment, have protrusions disposed on the inclined surface thereof such that the flow of raw water along the surface of the separation membrane is disturbed; and the channel for the processed water is in communication with the water passage at the inside of the water collection pipe by way of the openings perforated through the pipe wall of the water collection pipe.

18 Claims, 9 Drawing Sheets

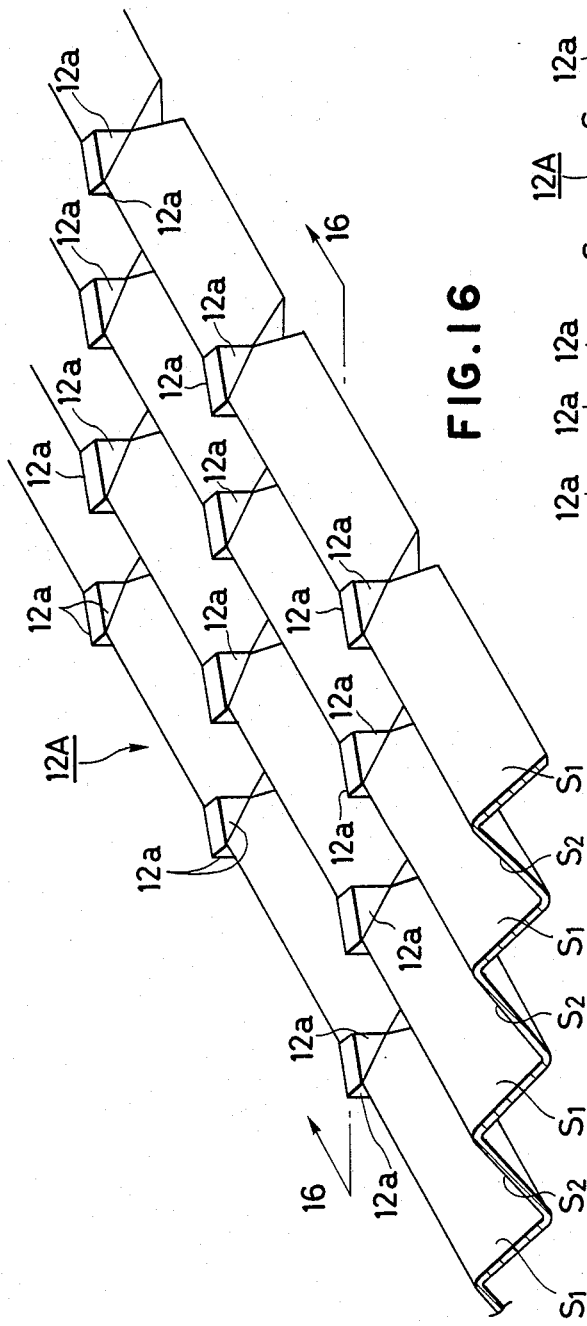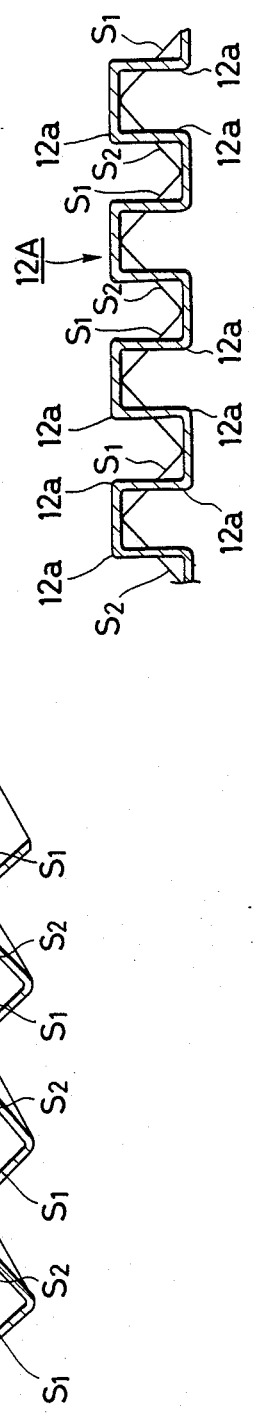

SPIRAL WOUND TYPE MEMBRANE MODULE

BACKGROUND OF THE INVENTION

Field of the Invention and Related Art Statement

The present invention concerns a spiral wound type membrane module used in a membrane separation device, such as a reverse osmosis membrane separation device, ultrafiltration device or microfiltration device and, more specifically, it relates to a spiral wound type membrane module in which flow channels between membranes are not clogged with suspended solids contained in raw water and the flow of raw water in the channels is disturbed to improve the permeation flow rate of permeate.

As a membrane module used for the membrane separation device such as a reverse osmosis membrane separation device, there has been known a spiral wound type membrane module in which a separation membrane is wound around the outer circumference of a water collection pipe. In such a spiral wound type membrane module, a spacer is put between membranes to form flow channel through which raw water passes and a net-like spacer has usually been employed as such a spacer.

In addition, a so-called corrugating type spacer has also been considered.

In a spiral wound type membrane module using such a net-like spacer, there is a problem that when raw water containing suspended solids is supplied, the net-like spacer suffers from clogging due to the suspended solids. Also in a spacer having V-shaped protrusions arranged in row, suspended solids are also caught at the ends of the protrusions thereby clogging the raw water flow channel.

In view of the above, it has been required to supply water to the membrane module after previously removing suspended solids from water, which required a complicated pre-treatment in the case of using the net-like spacer.

Such clogging in the raw water flow channel less occurs in the membrane module using a corrugated spacer, but linear flow channels are passed through from the inlet to the exit for the raw water in the module, in which less disturbance is given to the flow of raw water flowing between the membranes. Accordingly, the water flow in the channel tends to be a laminar flow to cause concentration polarization along with the membrane surface thereby tending to reduce the amount of permeate.

Accordingly, in the spiral wound type membrane module using the corrugated spacer, a desired amount of permeate can not be obtained unless raw water is supplied at a higher flow velocity than in the module in which net-like spacer is present, thereby bringing about a problem in view of the power cost.

OBJECT AND SUMMARY OF THE INVENTION

It is accordingly an object of the present invention to provide a spiral wound type membrane module capable of preventing clogging in the flow channel of raw water even for raw water containing suspended solids.

It is another object of the present invention to provide a spiral wound type membrane module in which the flow of the raw water in the flow channels is disturbed to remarkably reduce the concentration polarization along the surface of the separation membrane.

A still further object of the present invention is to provide a spiral wound type membrane module capable or obtaining a great amount of permeate without increasing the flow rate of raw water.

In a spiral wound type membrane module according to the present invention, a separation membrane is wound around the outer circumference of a water collection pipe by way of a corrugated spacer having corrugating ridges extended continuously in a zig-zag manner.

It is preferred that the corrugating ridges are in parallel with each other, have top edges respectively and that a bottom is formed between adjacent corrugating ridges.

The slanted surface of the corrugating ridge may partially have a linear portion in the extending direction of the corrugating ridge.

Further, it is preferred that the top edge of the corrugating ridge is a narrow flat top face and the bottom face between the adjacent corrugating ridges is a flat bottom.

In the present invention, a beam-like members may be arranged in the direction in perpendicular to the extending direction of the corrugating ridges in the flow channel of permeate, by which the compression strength of the spacer can be improved and the disturbing effect for the raw water can be promoted.

The spiral wound type membrane module according to the present invention comprises a separation membrane wound around the outer circumference of a water collection pipe by way of a spacers having protrusions on the inclined surface of corrugating ridges.

The protrusions may be disposed on either or both of the inclined surfaces of the spacer.

Each of the protrusions is preferably a triangular or semi-circular cylinder shape when viewed from above and it preferably protrudes to the surface of the spacer in the upper half and protrudes to the backside of the spacer in the lower half of the inclined surface.

In another preferred embodiment, trapezoidal protrusions are disposed to the inclined surface of the spacer, narrow width portions and wide width portions are arranged alternately in the top face at the edge of the corrugating ridge, the narrow width portion and the wide width portion are in adjacent with each other for the adjacent corrugating ridges such that the width for the flow channel of raw water is widened or narrowed.

The gap between each of the protrusions disposed to one corrugating ridge is preferably from 5 to 30 mm.

The moldability of the spacer is improved by adopting a plane-to-plane symmetry between the upper surface and the lower surface of the spacer.

BRIEF DESCRIPTION OF THE ACCOMPANYING DRAWINGS

FIG. 4 through FIG. 9 are, respectively, explanatory views for the constitution of the spacer, in which FIG. 4 and FIG. 7 are explanatory views for the flow of raw water along the spacer, while FIG. 5 and FIG. 8 are plan views for the spacer, FIG. 6 is a cross sectional view taking along line 6—6 in FIG. 5 and FIG. 9 is a cross sectional view taking along line 9—9 in FIG. 8;

FIG. 15 is a perspective view of the spacer 12A;

FIG. 16 is a cross sectional view taken along line 16—16 in FIG. 15;

DETAILED DESCRIPTION OF THE INVENTION

Figure 1:
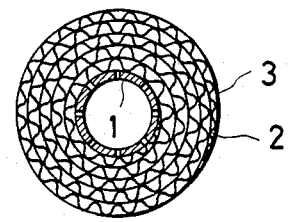
FIG. 1 is a cross sectional view for a spiral wound type membrane module according to one embodiment of the present invention.

The present invention is explained more specifically with respect to preferred embodiments illustrated in the drawings.

Figure 2:
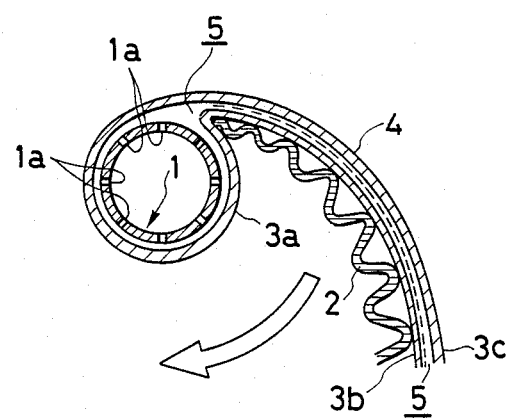
FIG. 2 is an explanatory cross sectional view for assembling.
Figure 3:
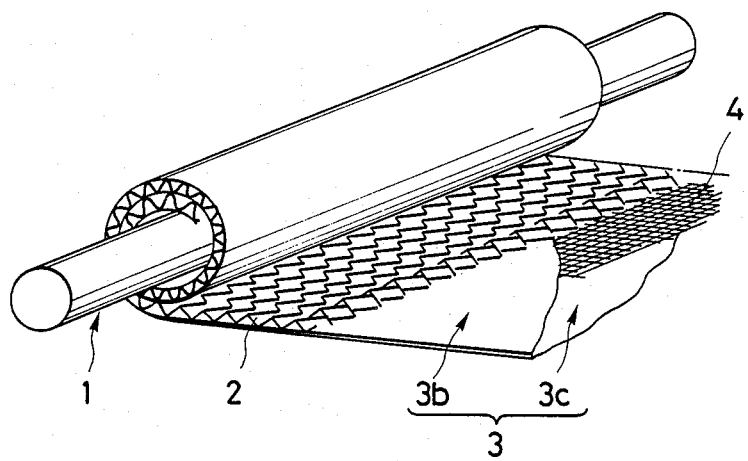
FIG. 3 is a perspective view of FIG. 2.

FIG. 1 is a cross sectional view of a spiral wound type membrane module as one embodiment according to the present invention in a direction perpendicular to the axis of the water collection pipe and FIGS. 2 and 3 are cross sectional view and a perspective view illustrating the assembling structure.

In the drawing, reference numeral 1 denotes a water collection pipe, around the outer circumference of which a separation membrane 3 is wound by way of a corrugated spacer 2. As shown in an enlarged scale in FIG. 2, perforations 1a communicating the inside and the outside of the pipe are perforated to the wall of the water collection pipe 1 and the separation membrane 3 is formed in an envelope-like form in this embodiment. The membrane surrounds at its middle portion 3a the water collection pipe 1 and end portions 3b, 3c are wound in an overlapped state around the circumference of the water collection pipe 1.

A mesh-like spacer 4 is inserted to the inside of the envelope-like separation membrane 3. The inside of the envelope-like separation membrane 3 constitutes a permeate channel 5. The spacer 2 is in a corrugated form, and has corrugating ridges extending continuously in a zig-zag manner as shown in FIG. 3.

In the spiral wound type membrane module thus constituted, raw water is passed between the separation membranes 3 in the direction of the membrane surface along both sides of the spacer 2, during which water permeates through the separation membranes 3 and flows into the permeate channel 5. The permeate flowing to the inside of the channel 5, flows in the channel 5 toward the water collection pipe 1, then enters through the perforations 1a to the inside of the collection pipe 1 and is then taken out from the membrane module as the permeate.

In the present invention, since the corrugating ridges of the spacer 2 on the separation membranes 3 extend in a zig-zag manner, the flow of raw water along the surface of the separation membranes 3 is disturbed. This can reduce the concentration polarization in the flow channel for raw water to obtain a great amount of permeate. It will be apparent that there are no protrusions that trap the suspended solids contained in the raw water, different from the case of the conventional net-like spacer or spacer having a row of V-shaped protrusions and clogging of the flow channel caused thereby can also be prevented.

In the present invention, it is only necessary that the corrugated spacer 2 has corrugating ridges continuously extended in the zig-zag manner and one example thereof is shown in FIG. 4 through FIG. 9.

Figure 4:
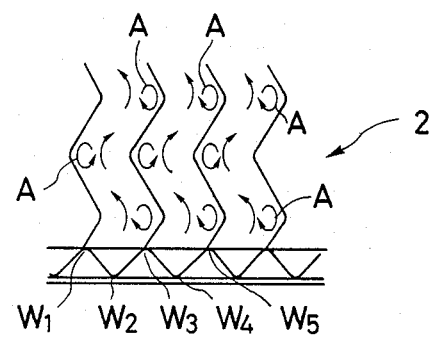
Figure 5:
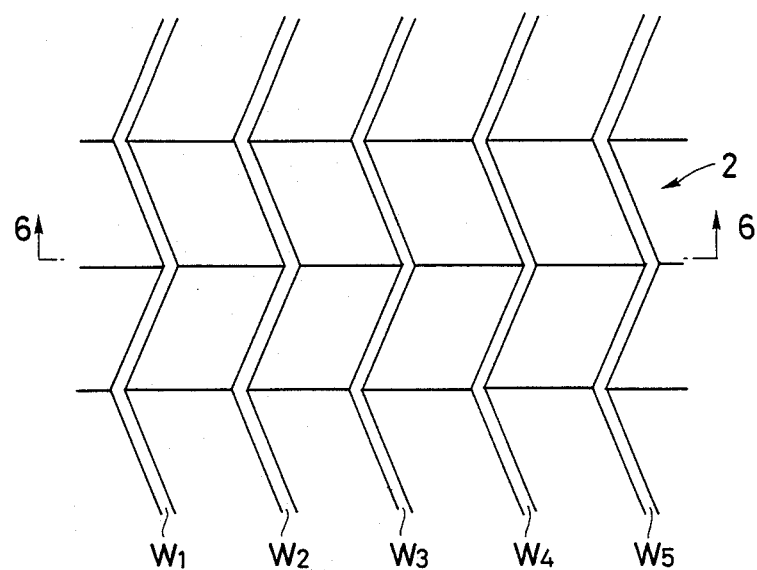
Figure 6:
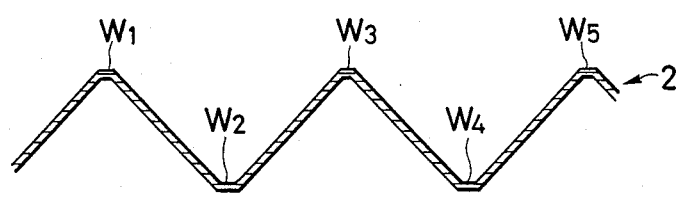

Corrugating ridges of the spacer 2 shown in FIG. 4 through FIG. 6 run in a zig-zag manner and, as shown in FIG. 5 (plan view), corrugating ridges $W_1$, $W_2$, $W_3$, ..., are in parallel with each other. In the illustrated state, $W_1$, $W_3$, $W_5$, ..., constitute top edges, while $W_2$, $W_4$, ... constitute bottoms. Then, as shown in FIG. 6 (cross sectional view taken along line 6—6 in FIG. 5), the width for the edge and the bottom of the corrugating ridge are narrowed.

Figure 7:
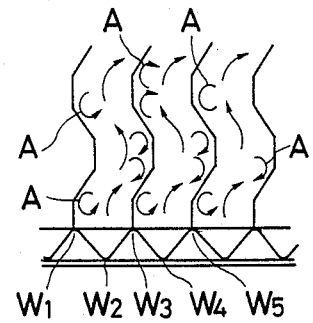
Figure 8:
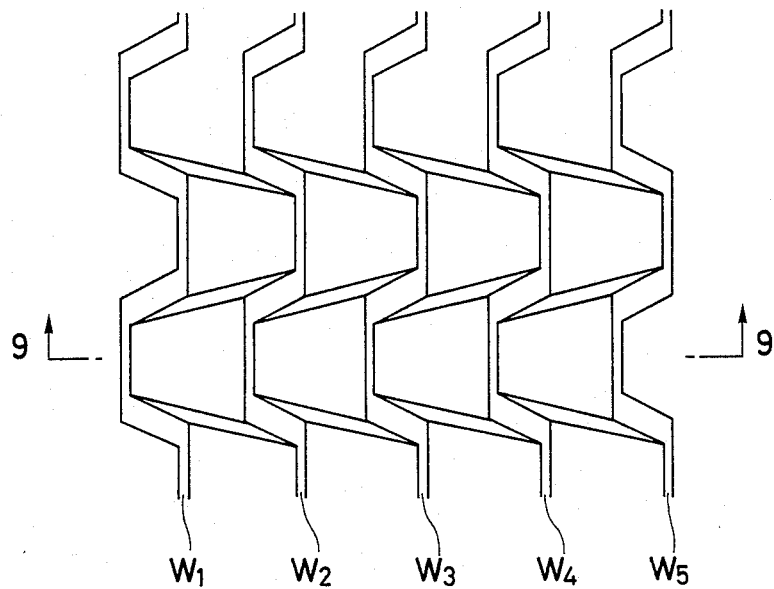
Figure 9:
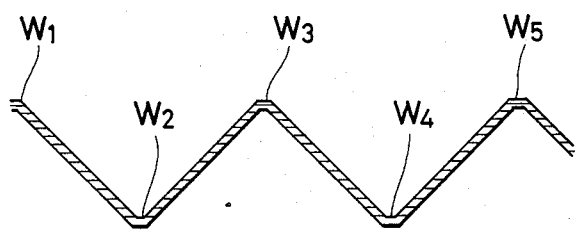

Corrugating ridges of the spacer 2 shown in FIGS. 7 through 9, also run in a zig-zag manner and the inclined surface of the corrugating ridges of the spacer 2 partially extended in the extending direction of the corrugating ridge. The corrugating ridges $W_1$, $W_2$, $W_3$, ..., are in parallel with each other as shown in FIG. 8 (plan view), each of the edges of the corrugating ridges $W_1$, $W_3$, $W_5$, ..., constitutes a narrow width flat top face as shown in FIG. 9, while the bottom face for each of the corrugating ridges $W_2$, $W_4$, ..., constitutes a flat bottom face (cross sectional view taken along line IX—IX in FIG. 8).

In FIG. 4 through FIG. 9, each of the corrugating ridges $W_1$, $W_2$, $W_3$, ..., runs in a zig-zag manner to cause disturbance for the flow as shown in FIG. 4 and FIG. 7 (shown by arrows A).

Any of the spacers shown in FIG. 4 through FIG. 9 is one embodiment employed in the present invention and spacers having corrugating ridges of other shapes may be used in the present invention.

Further, in the present invention, beam-like members may be arranged within the flow channel of permeate in the direction perpendicular to the extending direction of the corrugating ridges. In this case, recesses (not illustrated) are formed to portions of the top edge and/or bottom for each or the corrugating ridges of the spacer such that the beam-like members are fitted. In this way, the cross sectional coefficient of the spacers is increased to improve the compression strength of the spacer to prevent the collapse of the spacer upon winding the spacer together with the separation membranes around the surface of the water collection pipe. Furthermore, since unevenness is formed to the flow channel, the effect of disturbing the flow of raw water can also be promoted. Furthermore, since the beam-like members per se are disposed on the side of permeate, there is no worry that the fiberous matters contained in raw water are caught.

The spacer used in the present invention can easily be manufactured by vacuum forming of a synthetic resin sheet such as made of polyvinyl chloride, cellulose acetate, polypropylene and polyethylene with a thickness, for example, of about 0.05–0.5 mm.

In such a spiral wound type membrane module according to the present invention, since the corrugating ridges run in a zig-zag manner, the flow of the raw water along the membrane surface in the flow channel is disturbed. This can remarkably reduce the concentration polarization along the surface of the separation membrane to increase the amount of permeate. Accordingly, it is possible to obtain a great amount of permeate without increasing the flow velocity of raw water. In addition, the flow channel of raw water is continuous with no disconnection at the midway, and suspended solids are less caught and clogging of the flow channel of raw water can be prevented even for raw water containing suspended solids.

Figure 10:
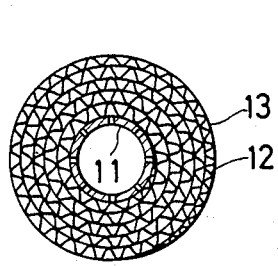
FIG. 10 is a cross sectional view for a spiral wound type membrane module according to another embodiment of the present invention.
Figure 11:
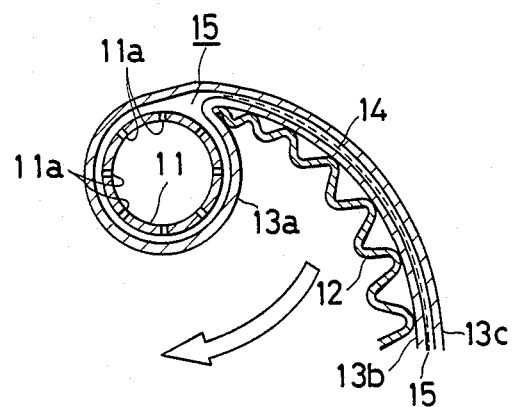
FIG. 11 is an explanatory cross sectional view for assembling.
Figure 12:
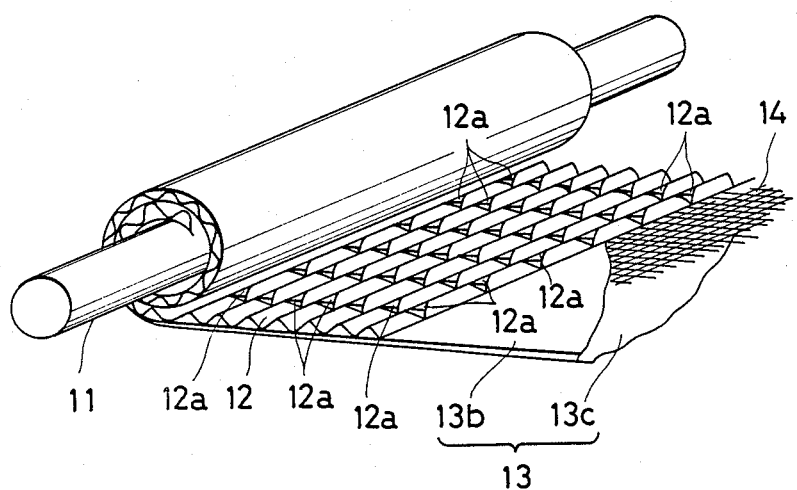
FIG. 12 is a perspective view of FIG. 11.
Figure 13:
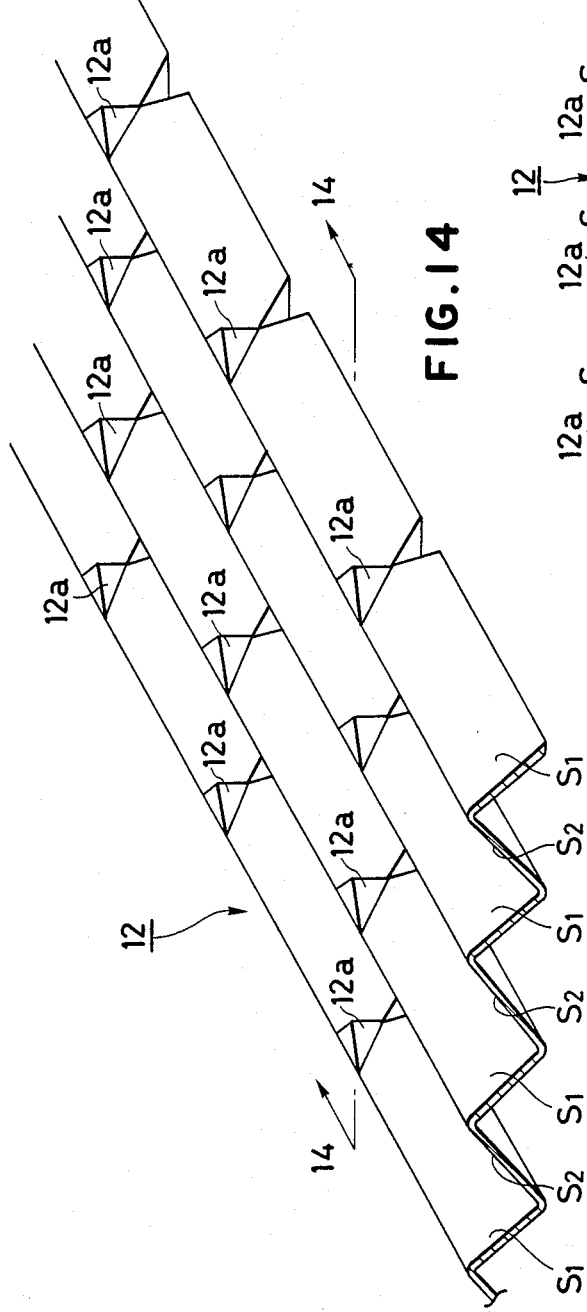
FIG. 13 is a perspective view for the spacer.
Figure 14:
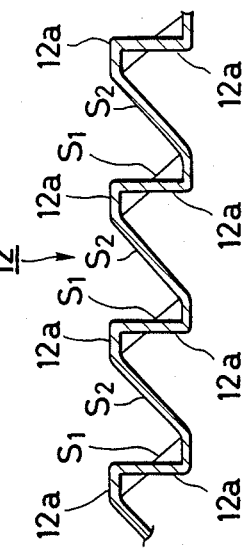
FIG. 14 is a cross sectional view taken along line 14—14 in FIG. 13.

FIG. 10 is a cross sectional view of a spiral wound type membrane module or another embodiment according to the present invention vertical to the axial direction of the water collection pipe and FIGS. 11 and 12 are a cross sectional view and a perspective view illustrating the assembling structure. Further, FIGS. 13 and 14 are a cross sectional view and a perspective illustrating the spacer.

In the drawing, reference numeral 11 denotes a water collection pipe, around the outer circumference of which a separation membrane 13 is wound by way of a corrugated spacer 12. As shown in an enlarged scale in FIG. 11, perforations 11a communicating the inside and the outside of the pipe are perforated to the wall of the water collection pipe 11 and the separation membrane 13 is formed in an envelope-like form in this embodiment. The membrane surrounds at its middle portion 13a the water collection pipe 1 and end portions 13b, 13c are wound around in an overlapped manner to the outer circumference of the water collection pipe 11.

Further, a mesh-spacer 14 is inserted to the inside of the envelope-like separation membrane 13. The inside of the envelope-like separation membrane 13 constitutes channel 15 for permeate. The spacer 12 is in a corrugating form and protrusions 12a are formed on one inclined surface $S_1$ of the corrugating ridges as shown in FIGS. 13 and 14. In this embodiment, the other inclined surface $S_2$ is a flat surface on which no protrusions are formed. The protrusion 12a is of a triangular shape in a plan view, which protrudes from the surface or the spacer in the upper half of the inclined surface $S_1$, while protrudes to the backside of the spacer in the lower half thereof.

In the thus constituted spiral wound type membrane module, raw water is passed between the separation membranes 13 along the both surfaces of the spacer 12 in the direction of the membrane surface, during which water permeates through the separation membrane 13 and flows to the inside of the permeate channel 15. The permeate flowing to the inside of the channel 15 flows in the channel 15 toward the water collection pipe 11, enters in the water collection pipe 11 through the perforations 11a and is then taken out from the membrane module as permeate.

Since the protrusions 12a are formed on the inclined surface $S_1$ of the corrugating ridges of the spacer 12 in the separation membrane 13, the fluid along the surface of the separation membranes is disturbed. This can reduce the concentration polarization in the raw water flow channel to obtain a great amount of permeate. As a matter of fact, the suspended solids contained in raw water are less caught and, thus, clogging of the raw water flow channel caused thereby can be prevented, different from the case of the net-like spacer.

In addition, since the protrusions 12a are disposed, the cross sectional coefficient of the spacer is increased to improve the compression strength of the spacer thereby enabling to prevent the worry that the spacer is collapsed upon winding up the spacer together with the separation membrane around the collection pipe.

Although the protrusions 12a are disposed only on one inclined surface $S_1$ of the corrugating ridges of the spacer in the above-mentioned embodiment, a spacer 12A as shown in FIG. 15 and FIG. 16 may be used for the present invention, in which the protrusions 12a are formed on both of the inclined surfaces $S_1$ and $S_2$.

Figure 17:
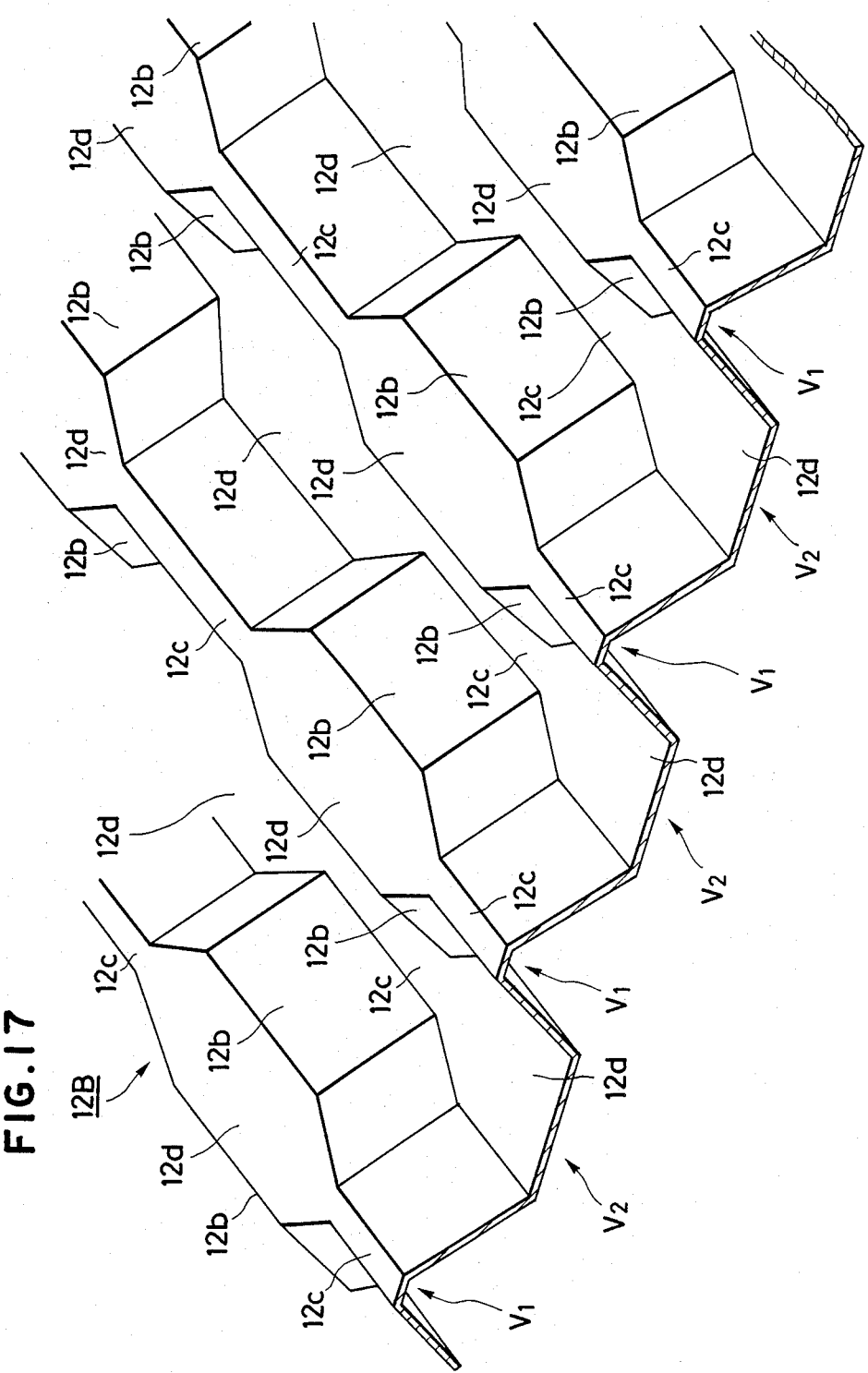
FIG. 17 is a perspective view for a portion of the spacer 12B.
Figure 18:
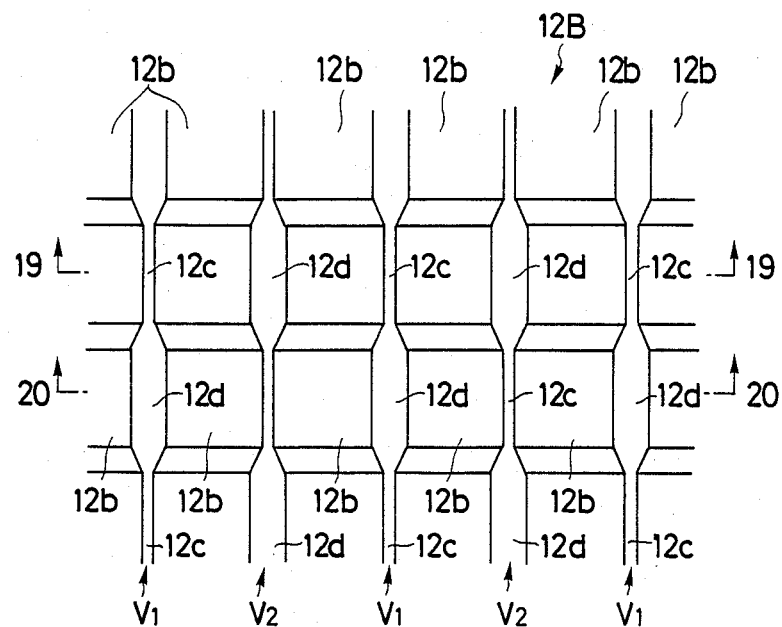
FIG. 18 is a plan view thereof.
Figure 19:
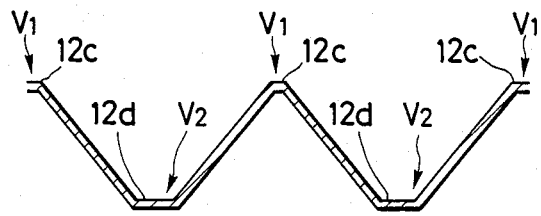
FIG. 19 and FIG. 20 are, respectively, cross sectional views taken along lines 19—19 and 20—20 in FIG. 18.
Figure 20:
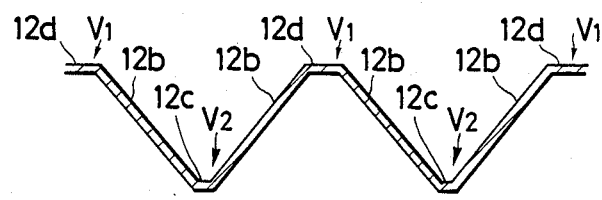

Further, a spacer 12B as shown in FIG. 17 (perspective view for a portion), FIG. 18 (plan view) and FIGS. 19 and 20 (cross sectional views) may be used for the present invention. In this spacer 12B, trapezoidal protrusions 12b are formed on the inclined surface of the corrugating ridges. In the spacer 12B, narrow width portions 12c and wide width portions 12d are alternately disposed at the top face of the edge of the corrugating ridges, so that the narrow width portion 12c and the wide width portion 12d are in adjacent to each other between the adjacent corrugating ridges (the corrugating ridge $V_1$ at the top and the wave shape $V_2$ at the bottom in the plan view), and the width of the raw water flow channel is widened and narrowed alternatively.

In the spacers 12A and 12B in FIGS. 15 through 20, the flow of the raw water is disturbed and a great amount of permeate can be obtained with less trapping of the suspended solids like that in the spacer 12 described above. In addition, the cross sectional coefficient is increased to improve the compression strength.

In the present invention, the distance between the protrusions 12a or 12b formed to one corrugating ridge is preferably from about 5 to 30 mm.

The spacer used in the membrane module shown in FIGS. 10 through 20 according to the present invention can also be manufactured in the same manner as described above easily, for example, by vacuum-forming a synthetic resin sheet of about 0.05–0.5 mm thickness such as of polyvinyl chloride, cellulose acetate, polypropylene and polyethylene.

Since the upper surface and the lower surface are in a plane-to-plane symmetry in each of the spacers illustrated, they can be vacuum-formed easily.

In the spiral wound type membrane module according to the present invention, since protrusions are formed on the inclined surface of the corrugating ridges, flow of raw water in the raw water flow channel along the membrane surface is disturbed. This can remarkably decrease the concentration polarization along the surface of the separation membrane. Accordingly, a great amount of permeate can be obtained without increasing the flow rate of the raw water.

In addition, since the raw water flow channel is made continuous with no disconnection, suspended solids therein are less caught and clogging of the raw water flow channel can be prevented even for raw water containing suspended solids. Furthermore, since the spacer has a great compression strength, it is not collapsed upon assembling the membrane module.

What is claimed is:
1. A spiral wound type membrane module for a water treating apparatus, comprising:
 a water collection pipe having a hollow inside for a water passage and a plurality of openings for communicating said hollow inside with outside,
 a separation membrane wound for plural turns around the water collection pipe to form laminated layers, said separation membrane having a processed water channel between the laminated layers to allow processed water after permeation through the separation membrane to flow therethrough, said processed water channel communicating with the water passage of said water collection pipe through the openings of said water collection pipe, and a spacer wound around the water collection pipe to be disposed between the laminated layers of the separation membrane to form a raw water channel for raw water to be processed, said spacer having corrugating ridges extending in the axial direction of the water collection pipe in a zigzag manner such that flow of raw water along the surface of said separation membrane is disturbed to prevent clogging in the raw water channel and to reduce concentration polarization along the separation membrane, whereby raw water permeates smoothly through the separation membrane in processing.

2. A spiral wound type membrane module as defined in claim 1, wherein the corrugating ridges are in parallel with each other.

3. A spiral wound type membrane module as defined in claim 1, wherein each corrugating ridge has a top edge and a bottom formed between the adjacent corrugating ridges.

4. A spiral wound type membrane module as defined in claim 3, wherein the top edge of the corrugating ridge has a narrow flat top surface and the bottom between the adjacent corrugating ridges forms a flat bottom.

5. A spiral wound type membrane module as defined in claim 1, wherein said spacer has inclined surfaces partially extending in the direction of the corrugation.

6. A spiral wound type membrane module as defined in claim 1, further comprising beam-like members disposed in the direction perpendicular to the extending direction of the corrugating ridges in the raw water channel.

7. A spiral wound type membrane module as defined in claim 1, wherein said spacer further includes recessed fitting portions on at least one of the edge and bottom portions of the spacer.

8. A spiral wound type membrane module as defined in claim 1, wherein the spacer is manufactured by vacuum-forming a synthetic resin sheet of from 0.05 to 0.5 mm thickness.

9. A spiral wound type membrane module as defined in claim 1, wherein the synthetic resin sheet is made of polyvinyl chloride, cellulose acetate, polypropylene or polyethylene.

10. A spiral wound type membrane module for a water treating apparatus, comprising:
   a water collection pipe having a hollow inside for a water passage and a plurality of openings for communicating said hollow inside with outside,
   a separation membrane wound for plural turns around the water collection pipe to form laminated layers, said separation membrane having a processed water channel between the laminated layers to allow processed water after permeation through the separation membrane to flow therethrough, said processed water channel communicating with the water passage of said water collection pipe through the openings of said water collection pipe, and
   a spacer wound around the water collection pipe to be disposed between the laminated layers of the separation membrane to form a raw water channel for raw water to be processed, said spacer having corrugating ridges extending in the axial direction of the water collection pipe, each corrugating ridge having at least one inclined surface and protrusions formed at the inclined surface thereof such that flow of raw water along the surface of said separation membrane is disturbed to prevent clogging in the raw water channel and to reduce concentration polarization along the separation membrane, whereby raw water permeates smoothly through the separation membrane in processing.

11. A spiral wound type membrane module as defined in claim 10, wherein each corrugating ridge has an inclined surface and a flat surface, the protrusions being formed on the inclined surface of the corrugating ridge.

12. A spiral wound type membrane module as defined in claim 10, wherein each protrusion is in a triagonal shape in a plan view, and each corrugating ridge has upper half, lower half, front face and rear face, the protrusions protruding on the front face in the upper half and protruding on the rear face in the lower half of the inclined surface.

13. A spiral wound type membrane module as defined in claim 10, wherein the protrusions are disposed on both of the inclined surfaces of the corrugating ridges.

14. A spiral wound type membrane module as defined in claim 10, wherein the protrusions are trapezoid and are formed on the inclined surface of the corrugating ridge of the spacer to form narrow portions and wide width portions alternately on the corrugating ridge, said narrow width portion and said wide width portion being arranged with the adjacent corrugating ridges such that the width of the raw water channel is widened or narrowed alternately.

15. A spiral wound type membrane module as defined in claim 10, wherein the distance between each of the adjacent protrusions disposed in one corrugation is from 5 to 30 mm.

16. A spiral wound type membrane module as defined in claim 10, wherein the spacer has upper surface and lower surface arranged in a plane-to-plane symmetry.

17. A spiral wound type membrane module as defined in claim 10, wherein the spacer is manufactured by vacuum-forming a synthetic resin sheet of from 0.05 to 0.5 mm thickness.

18. A spiral wound type membrane module as defined in claim 10, wherein the synthetic resin sheet is made of polyvinyl chloride, cellulose acetate, polypropylene or polyethylene.

* * * * *